Figure 1:
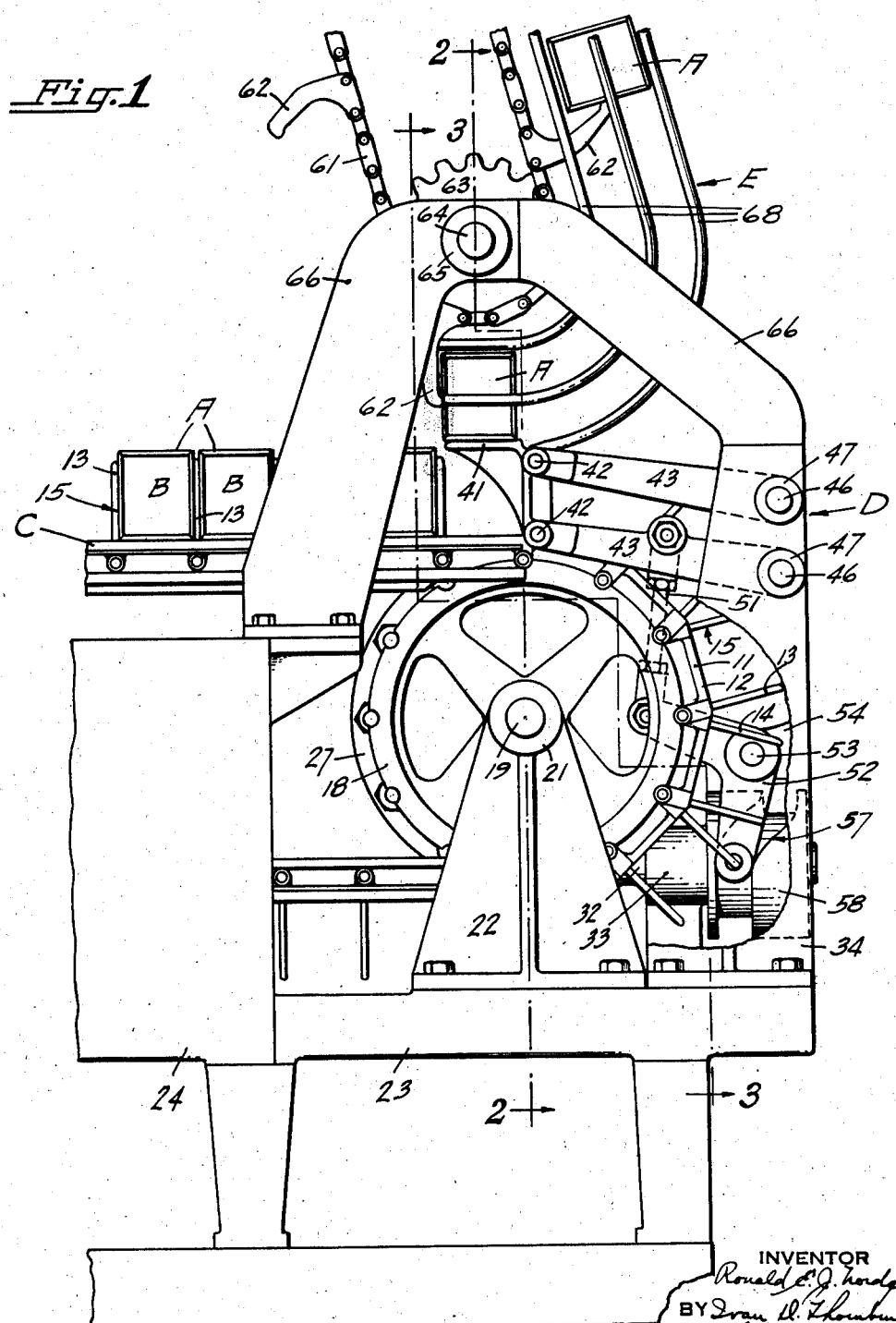

July 20, 1943.    R. E. J. NORDQUIST    2,324,531
CONVEYING MECHANISM
Filed Feb. 17, 1940    3 Sheets-Sheet 1

INVENTOR
Ronald E. J. Nordquist
BY
ATTORNEYS

July 20, 1943. R. E. J. NORDQUIST 2,324,531
CONVEYING MECHANISM
Filed Feb. 17, 1940 3 Sheets-Sheet 3

INVENTOR
Ronald E. J. Nordquist
BY
ATTORNEYS

Patented July 20, 1943

2,324,531

UNITED STATES PATENT OFFICE 2,324,531

CONVEYING MECHANISM

Ronald E. J. Nordquist, Maplewood, N. J., assignor to American Can Company, New York, N. Y., a corporation of New Jersey Application February 17, 1940, Serial No. 319,549

3 Claims. (Cl. 198—27)

The present invention relates to a container or can making machine and has particular reference to a transfer mechanism for the containers.

An object of the invention is the provision, in a container making machine, of a transfer mechanism wherein containers being operated upon while moving along a predetermined path of travel may be readily transferred from one part of the machine to another and directed along a different path of travel for subsequent operations without in any way affecting the travel timing of the containers or interfering with the operations being performed upon them.

Numerous other objects and advantages of the invention will be apparent as it is better understood from the following description, which, taken in connection with the accompanying drawings, discloses a preferred embodiment thereof.

Figure 2:
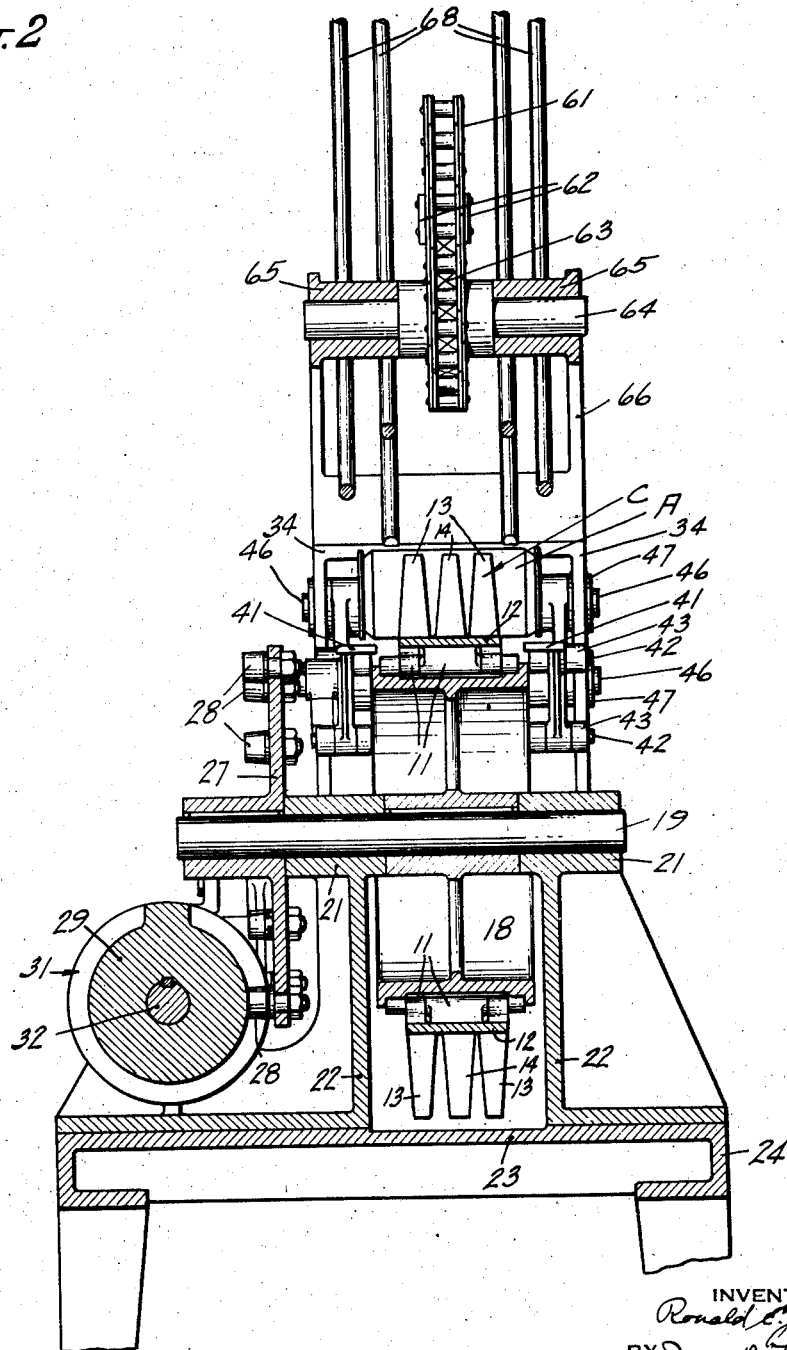
Figure 3:
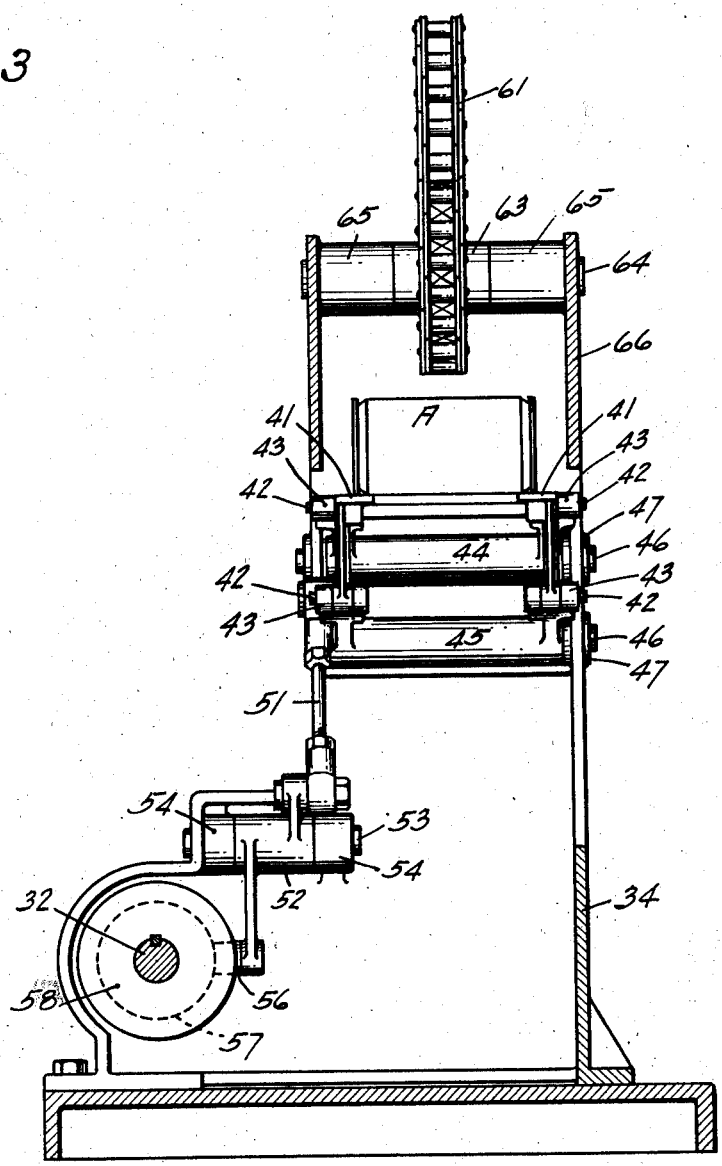

Referring to the drawings:

Figure 1 is a side elevation of a portion of a can making machine embodying the instant invention, with parts broken away; and Figs. 2 and 3 are transverse sectional views taken substantially along the respective broken lines 2—2 and 3—3 in Fig. 1, with Fig. 2 showing certain of the machine parts in a different position.

As a preferred embodiment of the instant invention the drawings illustrate the container conveying mechanism of a machine for operating on square fibre milk containers A of the character disclosed in United States Patent 2,085,979, issued July 6, 1937, to John M. Hothersall. In such a machine container end members B are sealed in place on the containers A while they are carried by a conveyor C along a predetermined straight line path of travel through the machine. The machine parts for effecting this sealing operation are omitted from the drawings since such parts form no part of the instant invention. After the sealing operation on a container the latter is transferred by a transfer mechanism D, preferably to a container elevator E for further operations.

The container conveyor C is preferably of the endless chain character comprising a plurality of connected long links 11 (Figs. 1 and 2) each having a flat broad platform 12. At one end of each platform there is a pair of spaced container retaining fingers 13 while at the opposite end there is only one finger 14. These fingers extend outwardly at right angles to the platform and thus provide a container carrying pocket 15 between them. It is in these pockets that the containers A are received at one end of the machine and in which they are carried through the machine while being operated upon at the various working stations.

Such a conveyor C operates over a pair of spaced sprockets 18 which are located one at each end of the machine. Only the one at the discharge end of the machine is shown in the drawings since the present invention is particularly directed to this end of the machine. The sprocket shown is the driving sprocket and is mounted on a transverse drive shaft 19 carried in bearings 21 formed in upright brackets 22 bolted to a base 23 which forms a part of the machine main frame, generally indicated by the numeral 24.

The conveyor C is preferably actuated in an intermittent or step-by-step movement so that the containers retained within its pockets 15 may be brought to rest while the work is being performed upon them. This intermittent motion is brought about by a cam indexing device which includes an indexing wheel 27 (Figs. 1 and 2) carried on an outer end of the drive shaft 19. The wheel carries a plurality of spaced cam rollers 28 arranged in a circle adjacent the outer edge thereof. These rollers are engaged one at a time by a continuously rotating barrel cam 29 and when so engaged they operate in and traverse a screw like or spiral cam groove 31.

Thus upon each rotation of the cam, one cam roller is engaged and moved along the axis of the cam a predetermined distance. This action rotates the indexing plate through a partial rotation and thus advances the conveyor one step.

The cam 29 is mounted on a cam shaft 32 journaled in a bearing formed in the bracket 22 and in another bearing 33 formed in a bracket 34 bolted to the base 23 adjacent the bracket 22. This shaft is driven in any suitable manner in time with the other moving parts of the machine.

The transfer mechanism D is located adjacent the discharge sprocket 18 so that as the containers A come adjacent this sprocket they may be readily transferred to another machine or to other sections of the same machine, as the case may be, for further operations. This transfer mechanism includes a pair of transfer elements or elevating platforms 41 (Figs. 1, 2 and 3) which are located one on each side of the moving conveyor C and adjacent the discharge sprocket 18.

Each transfer platform 41 is mounted on a pair of pivot pins 42 carried in the inner ends of a pair of parallelogram arms 43. There are four of these arms, two upper and two lower. The upper arms are formed on one long hub 44 while the lower arms are formed on a similar hub 45. These hubs are mounted on transverse pivot shafts 46 carried in bearings 47 formed in the upper portion of the bracket 34.

One of the lower parallelogram arms 43 is connected by a link 51 (Figs. 1 and 3) to a bell crank lever 52 which is mounted on a pivot pin 53 carried in a pair of spaced bearings 54 formed on the bracket 34. The bell crank also carries a cam roller 56 which operates in a cam groove 57 of a barrel cam 58 mounted on the continuously rotating cam shaft 32.

Hence the rotating cam 58 rocks the bell crank 52 and this in turn raises and lowers all of the parallelogram arms 43 and the transfer platform secured thereto to effect the transfer of a container A in the conveyor C. This transfer is preferably done while the conveyor is standing still, i. e., between its stepped movements.

At the time the conveyor C begins to move after such a period of rest and during its step advancement, the transfer platforms 41 are in lowered position, i. e., below the path of travel of the containers A, as best shown in Fig. 2. The moving conveyor brings a container A into a position directly over the transfer platforms and then comes to another rest period. While the conveyor remains stationary, the transfer platforms rise, pick up the container and lift it vertically out of its conveyor pocket 15.

In this raised position, the container is above the path of travel of the containers in the conveyor C and is adjacent the elevator E, hereinbefore mentioned. The elevator E thereupon removes the elevated container A from the transfer platform 41 and the latter thereupon returns to its original lowered position. It is thus in position for the next container which will be brought into place upon the next advancement of the conveyor C.

The elevator E is preferably a constantly moving endless chain conveyor 61 having a plurality of curved propelling fingers 62 secured thereto at spaced intervals along its length. Adjacent the machine under consideration the chain 61 takes over a sprocket 63 which is mounted on a shaft 64 journaled in bearings 65 formed in an arch bracket 66 supported on the main frame 24 and on the bracket 34.

Along one run of the chain 61 there is located a plurality of spaced and parallel guide rails 68 which are arranged to properly guide the containers A. The upper ends of these guide rails lead to any suitable place of deposit for the containers. The lower ends curve downwardly under the sprocket 63 and terminate adjacent the upper position of the transfer platform 41.

Hence when a container A is removed from the conveyor C and is raised into its elevated position by the transfer platform 41 it is directly in front of the lower terminal ends of the elevator guide rails 68 and is in the path of travel of the elevator fingers 62. The elevator is so timed with the operation of the transfer platform that as a container is brought into its elevated position one of the elevator fingers 62 immediately engages behind the container and sweeps it off the transfer platform into the support of the guide rails. The engaging finger further propels the container upwardly along the guide rails to a subsequent operation machine or to any suitable place of deposit as desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a container making machine, the combination of an intermittently movable conveyor for advancing containers in spaced relation thereon in a predetermined path of travel, a continuously movable endless conveyor spaced above said first mentioned conveyor and having a plurality of can engaging and propelling elements disposed in spaced relation thereon, a vertically movable transfer device disposed between said conveyors, said device when in lowered position successively receiving the advanced containers from said intermittently movable conveyor, means for moving said conveyors in timed relation, and means for actuating said transfer device in opposite vertical directions in time with the movement of said intermittently movable conveyor and when the latter is momentarily at rest, to successively elevate the containers advanced and received thereon into the path of travel of said endless conveyor in position to be successively engaged and propelled by said elements in a different path of travel.

2. In a container making machine, the combination of an intermittently movable conveyor for advancing containers in spaced relation thereon in a predetermined path of travel, a continuously movable endless conveyor spaced above said first mentioned conveyor and having a plurality of can engaging and propelling fingers disposed in spaced relation thereon, a pivotally mounted vertically movable transfer platform disposed between said conveyors, said platform when in lowered position successively receiving the advanced containers from said intermittently movable conveyor, means for intermittently moving said first mentioned conveyor, and means actuated by said conveyor moving means for elevating and lowering said transfer platform when said intermittently movable conveyor is momentarily at rest, to successively elevate the containers advanced and received thereon into the path of travel of said endless conveyor in position to be successively engaged and propelled by said conveyor fingers in a different path of travel.

3. In a container making machine, the combination of an intermittently movable conveyor for advancing containers in spaced relation thereon in a predetermined path of travel, a continuously movable endless conveyor spaced above said first mentioned conveyor and having a plurality of can engaging and propelling fingers disposed in spaced relation thereon, a cam shaft and index wheel for intermittently moving said first mentioned conveyor, a vertically movable transfer platform pivotally mounted between adjacent ends of said conveyors, a pivotally mounted bell crank lever connected to said platform, said platform when in lowered position successively receiving the advanced containers from said intermittently movable conveyor, means for moving said endless conveyor in timed relation with said intermittent conveyor, and cam means on said shaft and engaging said bell crank lever for alternately elevating and lowering said transfer platform on its pivotal mounting in time with the movement of said intermittently movable conveyor when the latter is momentarily at rest, to successively elevate the containers advanced and received thereon into the path of travel of said endless conveyor in position to be successively engaged and propelled by said conveyor fingers in a different path of travel.

RONALD E. J. NORDQUIST.